Patented Sept. 23, 1941

2,256,753

UNITED STATES PATENT OFFICE 2,256,753

STABILIZING CRACKED GASOLINE

Walter W. Scheumann, Tulsa, Okla., assignor to Cities Service Oil Company, Bartlesville, Okla., a corporation of Delaware No Drawing. Application February 23, 1939, Serial No. 257,959

3 Claims. (Cl. 44—9)

The present invention relates generally to oxidation inhibitors, and is more particularly concerned with the problem of stabilizing cracked gasoline against deterioration by oxidation and formation of gum during storage.

Various chemical oxidation inhibitors are at present in use for treating cracked gasoline. Certain phenols and amines, as well as aminophenols, have proven quite effective as oxidation inhibitors for stabilizing gasoline. In general the comparative effectiveness of such inhibitors is best determined by measuring the time of prolongation of the induction period of an unstable gasoline to which a measured amount of the inhibitor has been added, when tested by accelerated oxidation in an oxygen bomb originally charged to a pressure of 100 pounds at about room temperature. The induction period is the time in minutes during which a substantially constant pressure obtains within the bomb at a temperature of 100° C., before absorption of oxygen begins.

A primary object of the present invention is to provide an improved and economical oxidation inhibitor for stabilizing cracked gasoline.

It has been known for some time that appreciable quantities of phenolic compounds are present in the pressure distillates produced in many petroleum cracking plants. Such phenolic compounds are largely extracted from the cracked gasoline by the caustic soda refining treatment which the gasoline is normally given. The mixture of phenol homologues which can thus be extracted from cracked gasoline has been found to have some oxidation inhibiting value; and the present invention is based on the discovery that a very effective and economical oxidation inhibitor for cracked gasoline can be produced by chemical reaction between the extracted phenolic fraction of a cracked petroleum naphtha and certain aliphatic polyamines. The reaction product of a phenol and a polyamine is in general much more effective than the product of reaction of the phenol and a monoamine.

The following procedure has been found effective for recovering a suitable by-product phenol fraction from a raw cracked gasoline. Separation of the phenols from the gasoline is first made by extraction with caustic soda solution. During this operation organic sulphur compounds are also extracted from the gasoline. The next step is to separate the resulting phenolates and mercaptides from the caustic solution by extraction with acetone. The acetone can be recovered from this extract by fractional distillation overhead; leaving as a residue a caustic solution, which is diluted with water and steam distilled. This operation quite effectively separates the mercaptides from the phenolates, since the mercaptides hydrolyze in the hot dilute caustic to mercaptans, which distil off from the phenolates solution. The thus purified caustic solution of phenolates is then acidified, and the precipitated phenols are drawn off and extracted with sodium bicarbonate.

The penols thus extracted from cracked gasoline have been only partially identified. Essentially the extract consists of a mixture of phenol homologues—both mono and polyhydroxy—including cresols, xylenols, diphenols, naphthols and dinaphthols.

When the purified mixture of phenols thus extracted from cracked petroleum distillate is reacted with an aliphatic polyamine, the resulting product is an extremely effective oxidation and gum inhibitor for stabilizing cracked gasoline. A particularly effective and economical inhibitor results when the phenol extract is reacted with a polyamine such as diethylene triamine in the proportions of about nine parts by weight of the phenol mixture to one part of the amine. The resulting inhibitor is a mixture of unreacted phenol homologues together with the salts or phenolates formed by reaction of the amines with the more reactive phenols. The reaction is essentially a neutralization reaction between an acid and a base and proceeds smoothly with liberation of heat, according to the illustrative formula $$C_{10}H_7OH + RNH_2 \rightarrow C_{10}H_7ONH_3R$$

where

R is $NH_2CH_2CH_2NHCH_2CH_2-$ or other aliphatic polyamine group. However, the reaction is believed to be more complicated than that illustrated, for the reason that each amine group in the polyamine molecule may attach to a hydroxy group of a phenol or naphthol.

The following table illustrates the relative effectiveness of inhibitors produced by reacting the mixture of phenols extracted from a cracked petroleum distillate with diethylene triamine, in comparison with the invidual inhibiting value of the phenols and diethylene triamine, and in comparison with the inhibiting values of the reaction product of the phenols and the best two of a group of monoamines tested, namely di-iso-amylamine and tri-ethylamine.

| Amine reacted with a petroleum cracked distillate phenol | Parts phenols by weight | Parts amines by weight | Induction period at a concentration of 40 mg./100 cc. |
|---|---|---|---|
| | Percent | Percent | Minutes |
| Cracked gasoline—blank | | | 275 |
| Diethylene triamine (unreacted) | | 100 | 600 |
| Cracked distillate phenols (unreacted) | 100 | | 395 |
| Di-iso-amylamine | 3 | 1 | 465 |
| Tri-ethylamine | 3 | 1 | 465 |
| Diethylene triamine | 3 | 1 | 630 |
| Do | 9 | 1 | 620 |

The above table shows that an inhibitor comprising the "phenolate" product of reaction of one part of diethylene triamine with nine parts of cracked distillate phenols has about three times the inhibiting strength of the phenols themselves, and about twice the inhibiting strength of the best phenol-monoamine reaction product tested.

Other aliphatic polyamines produce efficient inhibitors by reaction with the cracked distillate phenols. For example, triethylene tetramine yields a very effective inhibitor by reaction with such phenols in proportions as large as 1:12 by weight.

Effective reagents can be prepared by reacting the cracked distillate phenols with ethylene diamine, tetraethylene pentamine, 1,3 propane diamine, dipropane triamine, tripropane tetramine, tetrapropane pentamine, 1,2 propanediamine, 1,2 butanediamine, 1,3 butanediamine, 1,2,3, butanetriamine, 1,2,4 butanetriamine, and other symmetrical and unsymmetrical aliphatic polyamines, including particularly aliphatic molecules made up of four, five, or more methylene groups containing one more amino group than the number of aliphatic radicals present.

The improved inhibitors are much less soluble in water and more soluble in gasoline than the corresponding aliphatic polyamines from which they are prepared.

The invention having been thus described, what is claimed as new is:

1. An oxidation and gum inhibitor for cracked gasoline comprising a mixture of phenolic components of cracked petroleum naphtha and phenolates thereof produced by reacting about three to twelve parts by weight of the said phenolic components with one part of an aliphatic polyamine.

2. An oxidation and gum inhibitor for cracked gasoline comprising, a mixture of phenolic components of cracked petroleum naphtha and phenolates thereof produced by reacting about nine parts by weight of the said phenolic components with one part of diethylene triamine.

3. The method of stabilizing cracked gasoline having gum forming and phenolic constituents which comprises, extracting and purifying the phenolic constituents, reacting chemically on at least part of the phenol extract with an aliphatic polyamine to produce a mixture of aliphatic polyamine phenolates, and adding such aliphatic polyamine phenolates to the gasoline in amount sufficient to retard the formation of gum.

WALTER W. SCHEUMANN.